United States Patent Office 2,879,165
Patented Mar. 24, 1959

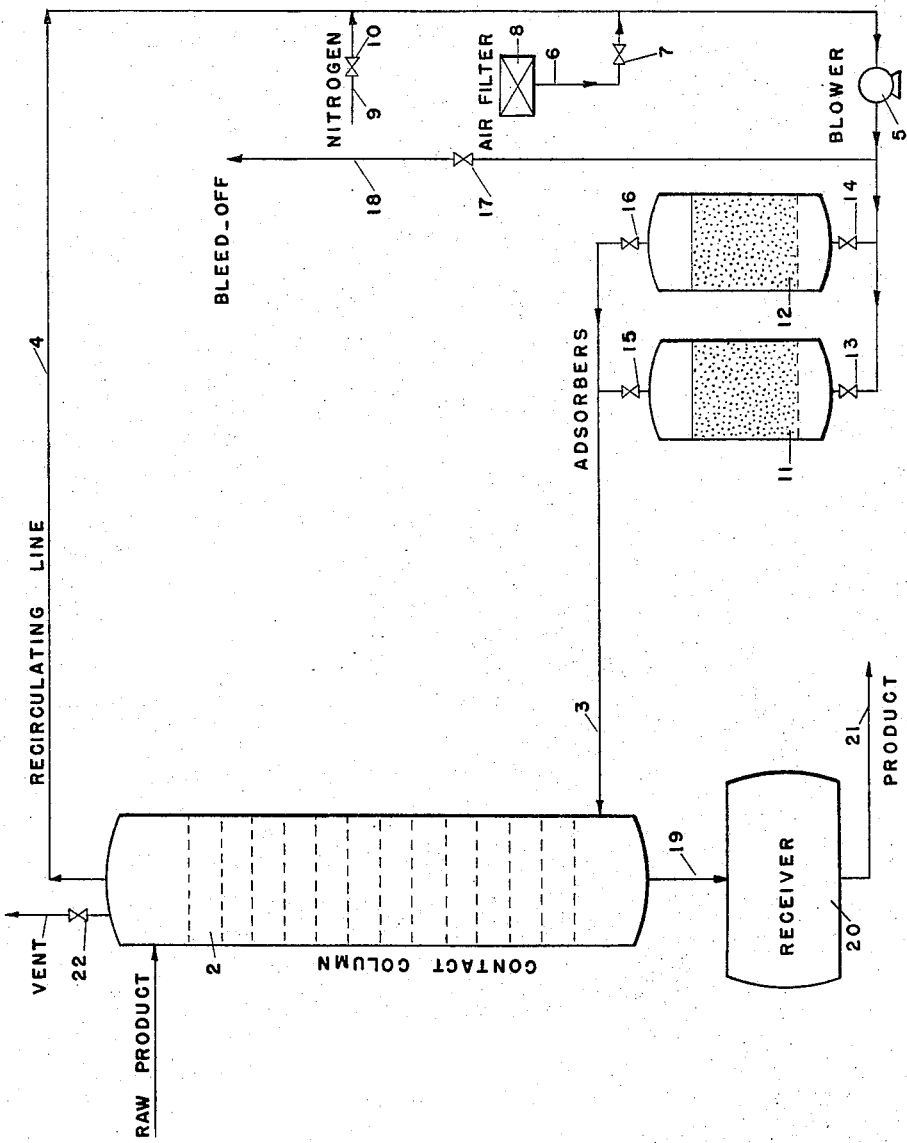

2,879,165

PURIFICATION OF AQUEOUS ETHYL ALCOHOL FOR USE IN BEVERAGES

Frank J. Hendel, Newark, N.J., assignor to The Distillers Company Limited, Linden, N.J., a corporation of Delaware Application January 19, 1956, Serial No. 560,151

3 Claims. (Cl. 99—48)

This invention relates to an improved process for treatment of aqueous ethyl alcohol containing impurities which are usually found when the alcohol is obtained by fermentation processes.

An object of this invention is to provide an improved process for the substantial removal of the above mentioned impurities in order to render or to prepare the product for the manufacture of alcoholic beverages.

A further object of this invention is to provide an improved process which not only substantially removes the above mentioned impurities but stabilizes and ages the product at the same time.

It is the present practice by the distillers that before aqueous ethyl alcohol can be used for the manufacture of alcoholic beverages, it has to be properly prepared by distillation and further purification. The purification process may be often costly and very cumbersome especially when additional rectification, filtration over charcoal and aging are concerned.

Thus, in rectification of alcohol solutions a great number of bubble plates, or equivalent, and a high reflux ratio are required to produce fairly pure aqueous alcohol.

In filtration over charcoal, the filtration must be carried out at a very slow rate (not less than 8 hours when preparing vodka), and requires discarding great quantities of charcoal (6 pounds per 100 gallons of distilled aqueous alcohol). Such discarding constitutes not only a loss of costly charcoal but also of some alcohol contained in the pores of spent charcoal. Reactivation or regeneration of charcoal is usually not practiced, as it is a cumbersome procedure requiring special equipment. Filtration through charcoal or any other suitable adsorbent or ion-exchange resins carries always a possibility that some objectionable organic or inorganic matter may be leached out from the adsorbent and contaminate the alcoholic beverage.

It is known that wood charcoal or coconut charcoal contain a certain amount of sodium and potassium salts which come from the wood or the coconut used as a raw material. These salts are soluble in water and hence are found later on in the treated aqueous alcohol. Very often charcoal (activated carbon) is obtained by impregnating the raw materials with zinc chloride which, when heated to high temperatures evaporates, thus creating a multitude of tiny pores. Some of the zinc chloride may, however, remain in the charcoal and then it will be leached out when used for treatment of water solutions.

For instance, a commercial grain alcohol 190.3 proof containing:

| | | |
|---|---|---|
| Ethyl alcohol | percent | 95.15 |
| Acidity as $CH_3COOH$ | g./100 liters | 1.3 |
| Esters as $CH_3COOC_2H_5$ | g./100 liters | 3.7 |
| Aldehydes as $CH_3CHO$ | g./100 liters | 0.17 |
| Higher alcohols (fusel oil) | g./100 liters | 31.0 |
| Furfural | | Nil |
| Solid extract | | Nil | was diluted with demineralized water to 100 proof alcohol (50.35% $C_2H_5OH$) and purified by percolating it for over eight hours through charcoal used in a ratio of at least 1½ pounds of charcoal for each gallon of the 100 proof alcohol. The produce was marketed as "Vodka" and showed a solid content of 5.4 g./100 liters. Only a minor part of the above extract was due to the addition of water which, even after demineralization, contained traces of mineral compounds. The balance of the extract came apparently from the charcoal.

In aging e.g. whiskey a long time is required (usually 4 to 7 years) before the product can be marketed. During such aging the content of acids, esters, aldehydes, ketones and fusel oil is only slightly decreased. However, their content is stabilized and will not change during additional storage. Aging is often accomplished by percolation or filtration of the aqueous alcohol through or with a suitable adsorbent which selectively adsorbs the higher alcohols and other impurities.

I have now discovered that a good purification of aqueous ethyl alcohol, and particularly of the ones which were already obtained by proper distillation, can be effectively performed by blowing a gas through the solution at substantially atmospheric temperatures. The gas is preferably blown countercurrently to the liquid descending in a contact column which can be of bubble plate, sieve, disc and doughnut, packed column, or similar design. The gas becomes saturated with the vapors of ethyl alcohol and of the volatile impurities and is then drawn through a suitable adsorbent which removes at least part of the impurities. The gas is then fully or to a greater extent recirculated back to the above column for reuse thus avoiding a substantial loss of ethyl alcohol vaporized by the gas.

Volatile impurities, especially low boiling components, which are not readily adsorbed by the adsorbent, tend to accumulate in the recirculating gas. Hence, it is advantageous in such cases to bleed off small amounts of the gas mixture. The bleeding off can be done in a continuous manner from the discharge of the recirculating compressor, or blower. The bled-off gas can be replaced by fresh gas drawn at the suction of the above compressor or blower.

According to Raoult's law, the partial vapor pressure of the volatile impurities in the alcohol water solution can be calculated. A mixture of vapors released from the solution into the recirculating gas and the gas itself obeys Amagat's law of additive volumes and Dalton's law of additive pressures. The total pressure is composed of partial pressures of each gas or vapor component. The above mixture being composed of non-ideal gases and vapors shows, of course, a minor deviation from the above laws.

The compounds which are removed fully or partially from the impure aqueous ethyl alcohol by the gas stream are e.g. as follows:

| | Degree C. |
|---|---|
| Acetaldehyde, having a boiling point | 21 |
| Ethyl ether, having a boiling point | 34.6 |
| Acrolein, having a boiling point | 52.5 |
| Acetone, having a boiling point | 56.5 |
| Methyl alcohol, having a boiling point | 64.7 |
| Ethyl ethanoate (acetic ester), having a boiling point | 77.15 |
| Isopropyl alcohol, having a boiling point | 82.3 |
| Tert-butyl alcohol, having a boiling point | 82.8 |
| n-Propyl alcohol, having a boiling point | 97.19 |
| Sec-butyl alcohol, having a boiling point | 99.5 |
| Tert-amyl alcohol, having a boiling point | 101.8 |
| Crotonaldehyde, having a boiling point | 104 |
| Isobutyl alcohol, having a boiling point | 108.39 |
| Sec-isoamyl alcohol, having a boiling point | 114 |

|   | Degree C. |
|---|---|
| Pyridine, having a boiling point | 115 |
| n-Butyl alcohol, having a boiling point | 117.71 |
| Acetic acid, having a boiling point | 118.1 |
| Active amyl alcohol, having a boiling point | 128 |
| Isoamyl alcohol, having a boiling point | 131.5 |
| n-Amyl alcohol, having a boiling point | 138 |
| Furfural, having a boiling point | 162 |

The lower boiling compounds have a relatively high vapor pressure and hence are easily desorbed by the recirculating gas. However, some of the higher boiling compounds, like amyl alcohols, show a remarkably high vapor pressure in presence of water and hence will also be desorbed to some extent by the recirculating gas.

The adsorption rate of the above impurities from the gas-vapor phase by the usual adsorbent is, in general, much greater than when they are in liquid phase i.e. dissolved in aqueous ethyl alcohol.

A further advantage of using my new gas desorption-adsorption method lies in the fact that the adsorbent is not in a direct contact with the aqueous alcohol and cannot contaminate the liquid.

An additional advantage of my method lies in accelerating the aging and stabilization of the aqueous alcohol. The recirculating gas may usually be composed of air. Oxygen in the recirculating gas in contact with the aqueous alcohol will mildly oxidize the compounds which are usually oxidized only during lengthy storing of the liquor.

If, however, such mild oxidation has to be avoided, the recirculating gas may consist fully, or to a greater extent, of a neutral gas like nitrogen.

On the other hand, if a more rapid stabilization and oxidation is desired the recirculating gas may be enriched with oxygen. Besides, the adsorbent may contain an oxidation catalyst which will accelerate the oxidation of the organic compounds in vapor phase while passing together with the recirculating gas through the adsorption bed. Thus, in certain instances it is advisable to oxidize traces of ethyl alcohol to acetic acid which will combine with unconverted ethyl alcohol to ethyl ethanoate (acetic ester). The latter has a pleasant fruity odor which is imparted to the alcoholic beverage. It is known that charcoal or activated carbon catalyzes the oxidation and the esterification reactions of ethyl and higher alcohols so that some of the fusel oil is also converted into aldehydes, ketones, acids and esters, thus improving the odor and taste of the beverage. However, in case of vodka manufacturing it is not desirable to impart any additional odor to the liquor as vodka should be free of any flavor. In such case any oxidation or esterification reaction should be prevented and that is why my purification process is of special advantage.

The figure is a diagrammatic elevation view of a plant suitable for carrying out the process according to my invention. With reference to the figure the raw product composed of a crude aqueous ethyl alcohol is continuously fed through line 1 to the top of contact column 2. There it flows down countercurrently to the gas stream which enters the column near its bottom through line 3, and after desorbing from the raw product a substantial amount of impurities leaves the column at the top. The gas saturated with vapors of alcohol, water and all volatile impurities is drawn through the recirculating line 4 by the blower 5. The gas discharged by the blower passes either adsorber 11 or 12 for the adsorption of a substantial amount of impurities and then returns to the contact column 2. The product freed substantially from the objectionable impurities, odor and flavor leaves the contact column through the outlet 19 to the receiver 20 and from there through line 21 to storage or directly for bottling. If the product requires some clarification it may be filtered through a suitable filter.

A small amount of recirculating gas is continuously or periodically bled off through the valve 17 and line 18 and discharged to the atmosphere. Replacing the bled-off gas, fresh air is drawn through the air filter 8 and line 6 into the suction line of the blower 5 by opening slightly valve 7. Instead of air, nitrogen gas from a cylinder may be added through line 9 and valve 10. The bleeding off part of the recirculating gas is a precaution taken to avoid any accumulation in the recirculating gas of objectionable impurities which might not be readily adsorbed in the adsorber.

The adsorbers 11 and 12 are filled with conventional adsorbents like activated carbon, charcoal, fuller's earth, etc. The adsorbers are used interchangeably depending on the activity of the adsorbent in the given adsorber. Thus, if adsorber 11 contains a spent adsorbent valves 16 and 14 are opened and valves 15 and 13 are closed in order to permit the recirculating gas to pass through the adsorber 12 with fresh adsorbent. Meanwhile the spent adsorbent in the adsorber 11 is dumped and replaced by fresh adsorbent through manholes, covers and openings which are not shown in the figure. The adsorbent may be reactivated or regenerated in situ by the one of several known methods.

In case oxygen has to be excluded fully or substantially from the recirculating gases the system has to be prepared as follows: before starting to introduce the raw product vent 22 on top of the contact tower is fully opened and nitrogen introduced into the whole system through line 9 and valve 10 while blower 5 is running. Both adsorbers may be filled by nitrogen at the same time by keeping valves 13, 14, 15, and 16 open. Valves 7 and 17 are kept closed during the introduction of nitrogen.

Examples of the application of my invention will serve to clarify the principles thereof and to illustrate the advantages accruing from this method. It is to be understood that the following examples are given by way of illustration and not of limitation.

Example I

Grain neutral spirits 100 proof which is a commercial grain alcohol diluted with demineralized water was treated with recirculating nitrogen gas in a contact column packed with porcelain Raschig rings. The rate of flow of the aqueous alcohol was 0.1 gallon per minute and the rate of flow of recirculating gas was 2 cubic feet per minute. The contact time of the liquid and gas was 40 seconds i.e. it takes so much time for each drop of aqueous alcohol which enters the top of the column to reach the bottom of the Raschig ring packings. The recirculating gas entered the column below the packing and was removed at some distance above the packing, the distance being sufficient for full disengaging of entrained liquid droplets from the gas. The temperature in the contact column was 75° F. and the pressure in the top of the column was 14.5 pounds per square inch absolute.

Before the introduction of aqueous alcohol the system, including the adsorption column, was purged with nitrogen from a cylinder. The recirculation of the gas was accomplished by a compressor.

The adsorption system consists of one adsorption column containing 12 pounds of activated charcoal of 12/30 mesh. The adsorber had an internal diameter 6 inches and was 3 feet high. The height of the bed of the adsorbent was 2 feet. The recirculating gas was blown through the bed upwards. Once a day a small amount of the recirculating gas was bled off through a vent on the discharge end of the compressor and an equivalent amount of fresh nitrogen gas was introduced through a valve located upstream of the compressor. After 400 hours of operation having processed 2400 gallons of the raw product, the adsorbent in the adsorption column was discarded.

The analysis of the feed to the contact column and the product obtained at the end of the 400-hour run showed the following results:

|  | Raw Material | Product | Commercial Vodka |
|---|---|---|---|
| Alcohol by volume_____percent__ | 50.19 | 50.18 | 50.35 |
| Solid extract_____g./100 l__ | 0.6 | 0.6 | 5.4 |
| Acidity as $CH_3COOH$_____g./100 l__ | 1.0 | 0.9 | 1.0 |
| Esters as $CH_3COOC_2H_5$____g./100 l__ | 1.6 | 1.4 | 1.8 |
| Aldehydes as $CH_3CHO$_____g./100 l__ | 0.1 | 0.0 | 2.0 |
| Furfural_____g./100 l__ | Below 0.25 | Below 0.25 | Below 0.25 |
| Higher Alcohols (fusel oil)____g./100 l__ | 23.0 | 23.0 | 28.0 |
| Permanganate Time_____Min__ | 50 | 60 | 55 |
| Taste preference test_____percent__ | 40 | 85 | 80 |

Although the content of the impurities chemically determined did not decrease markedly, the taste preference test showed a product without distinctive character aroma and taste and is at least equal to or better than a good commercial grade of vodka. The impurities which could be determined are also below the content of impurities found in a good commercial grade of vodka. It is felt that this is an improvement over the present method of producing vodka.

*Example II*

Raw unaged whisky obtained from alcohol fermentation of 51% rye, 39% corn, and 10% small grain mash was treated in the same apparatus as described in Example I. The activated charcoal used in Example I was dumped and substituted by fuller's earth of 16/30 mesh. The rate of flow of the raw whisky was 0.05 gallon per minute and the rate of flow of recirculating gas was 2 cubic feet per minute. As the recirculating gas, a mixture of air and nitrogen at a ratio 1:1 was used. Other conditions of treatment were the same as in Example I.

The analysis of the raw whisky and of the treated one showed as in the case of Example I, that the content of esters, aldehydes, acids and higher alcohols did not change substantially, but the aroma and taste was greatly improved.

Having described and illustrated the principles of my invention, I do not wish to be limited to the specific details shown and described as it is obvious that various changes may be made within the scope of my claims without departing from the spirit of my invention.

I claim:

1. A process for the treatment of aqueous ethyl alcohol obtained by fermentation, distillation and rectification processes, and containing small quantities of impurities adversely affecting aroma and taste of the alcoholic beverages, which comprises flowing a gas countercurrently to a stream of the said aqueous alcohol at substantially atmospheric temperatures of about 75° F. and at substantially atmospheric pressures, passing then said gas containing a substantial amount of vapors of ethyl alcohol, of water and of the said impurities through an adsorption bed consisting of dry solid particles, and recirculating the said gas now substantially free from the said impurities due to being adsorbed in the said adsorption bed for commingling with fresh quantities of said aqueous ethyl alcohol, thus improving the taste and aroma of the aqueous alcohol which renders it suitable for use as vodka.

2. A process for the treatment of grain neutral spirits obtained by a dilution of commercial grain alcohol containing traces of objectionable impurities with demineralized water, which comprises flowing nitrogen gas countercurrently to a stream of the said neutral spirit at substantially atmospheric temperature of about 75° F. and at substantially atmospheric pressures, passing then said gas containing a substantial amount of vapors of ethyl alcohol, water, and of the said impurities through an adsorption bed of activated charcoal in order to remove the said impurities from the gas stream and reusing the nitrogen for countercurrent flow with fresh quantities of said neutral spirit, thus obtaining a neutral spirit without distinctive aroma and taste and which is equivalent to a good commercial grade of vodka.

3. A process as defined in claim 2 wherein the relative rate of flow of the neutral spirit is from about 0.5 to about 0.1 gallon per minute and that of the nitrogen is about 2 c.f.m. and the contact time between the countercurrently flowing nitrogen and neutral spirit is about 40 seconds.

References Cited in the file of this patent

UNITED STATES PATENTS

| | | |
|---|---|---|
| 532,399 | Scott _____ | Jan. 8, 1895 |
| 1,766,428 | Cozzolino _____ | June 24, 1930 |
| 2,050,908 | Willkie _____ | Aug. 11, 1936 |
| 2,054,006 | Shoeld _____ | Sept. 8, 1936 |
| 2,145,243 | Bagby _____ | Jan. 31, 1938 |